(12) United States Patent
Lian

(10) Patent No.: US 10,768,669 B2
(45) Date of Patent: Sep. 8, 2020

(54) ELECTRONIC DEVICE WITH FLEXIBLE DISPLAY

(71) Applicant: Lenovo (Beijing) Limited, Beijing (CN)

(72) Inventor: Zhixun Lian, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 145 days.

(21) Appl. No.: 15/473,383

(22) Filed: Mar. 29, 2017

(65) Prior Publication Data

US 2017/0287385 A1  Oct. 5, 2017

(30) Foreign Application Priority Data

Mar. 29, 2016 (CN) .......................... 2016 1 0189228

(51) Int. Cl.
| | |
|---|---|
| G09G 5/00 | (2006.01) |
| G06F 3/041 | (2006.01) |
| G06F 3/045 | (2006.01) |
| G06F 1/16 | (2006.01) |
| G09F 9/30 | (2006.01) |
| H04M 1/02 | (2006.01) |

(52) U.S. Cl.
CPC .......... *G06F 1/1652* (2013.01); *G06F 1/1616* (2013.01); *G06F 1/1677* (2013.01); *G06F 1/1681* (2013.01); *G09F 9/301* (2013.01); *H04M 1/022* (2013.01); *H04M 1/0216* (2013.01); *H04M 1/0268* (2013.01)

(58) Field of Classification Search
CPC .................................................. G09G 3/2092
See application file for complete search history.

(56) References Cited

U.S. PATENT DOCUMENTS

| | | | |
|---|---|---|---|
| 8,125,759 B2 * | 2/2012 | Fukuma | F16G 13/18 248/349.1 |
| 2010/0232100 A1 * | 9/2010 | Fukuma | F16G 13/18 361/679.01 |
| 2012/0194448 A1 * | 8/2012 | Rothkopf | A45C 13/002 345/173 |
| 2013/0010405 A1 | 1/2013 | Rothkopf et al. | |
| 2016/0048170 A1 * | 2/2016 | Kim | G06F 3/0414 345/173 |
| 2016/0147267 A1 * | 5/2016 | Campbell | G06F 1/1681 361/679.27 |
| 2017/0038641 A1 * | 2/2017 | Yamazaki | G02F 1/133555 |

FOREIGN PATENT DOCUMENTS

| | | |
|---|---|---|
| CN | 104378467 A | 2/2015 |
| CN | 105321430 A | 2/2016 |

* cited by examiner

*Primary Examiner* — Nan-Ying Yang

(74) *Attorney, Agent, or Firm* — Kunzler Bean & Adamson

(57) ABSTRACT

Embodiments described herein include an electronic device. The electronic device includes a body and a display screen. The body includes at least a first surface. The display screen includes a first portion and a second portion separated from the first portion by a first bending portion. The second portion is secured to the first surface of the body. The bending portion deforms to rotate the first portion with respect to the second portion.

9 Claims, 7 Drawing Sheets

ELECTRONIC DEVICE WITH FLEXIBLE DISPLAY

FIELD

The present invention relates to the field of electronic devices and the manufacturing thereof, and in particular, relates to an electronic device with a flexible display.

BACKGROUND

With the constant development of science and technology, electronic technology has also rapidly developed. Various types of electronic products have been developed, enabling people to benefit from the convenience resulting from the availability of many different electronic products.

Now take smartphones as an example, whose display screen is, in general, secured under its front housing and is maintained at a fixed relative position to the front housing. During use, the user cannot change the relative position between the display screen and the front housing of the smartphone. Therefore, in order to change the angle of view, the user has to change the relative position between his/her entire smartphone and himself/herself, which can be inconvenient.

SUMMARY

Various embodiments described herein include an electronic device. The electronic device includes a body and a display screen. The body includes at least a first surface. The display screen includes a first portion and a second portion separated from the first portion by a first bending portion. The second portion is secured to the first surface of the body. The bending portion deforms to rotate the first portion with respect to the second portion.

BRIEF DESCRIPTION OF THE DRAWINGS

The foregoing and other objects, features and advantages of the present disclosure will become more apparent from the detailed descriptions of the embodiments of the present disclosure in conjunction with the drawings. The drawings are used to provide a further understanding of the embodiments of the present disclosure and constitute a part of the Description, which, together with the embodiments of the present disclosure, serve to explain the present disclosure and are not construed as a limitation to the present disclosure. Unless explicitly indicated, the drawings should not be understood as being drawn to scale. In the drawings, the same reference numerals generally represent the same components or steps. In the drawings.

DETAILED DESCRIPTION

The technical solutions of the embodiments of the present invention are clearly and thoroughly described hereinafter with reference to the accompanying drawings illustrating some of the embodiments of the present invention.

Figure 1:
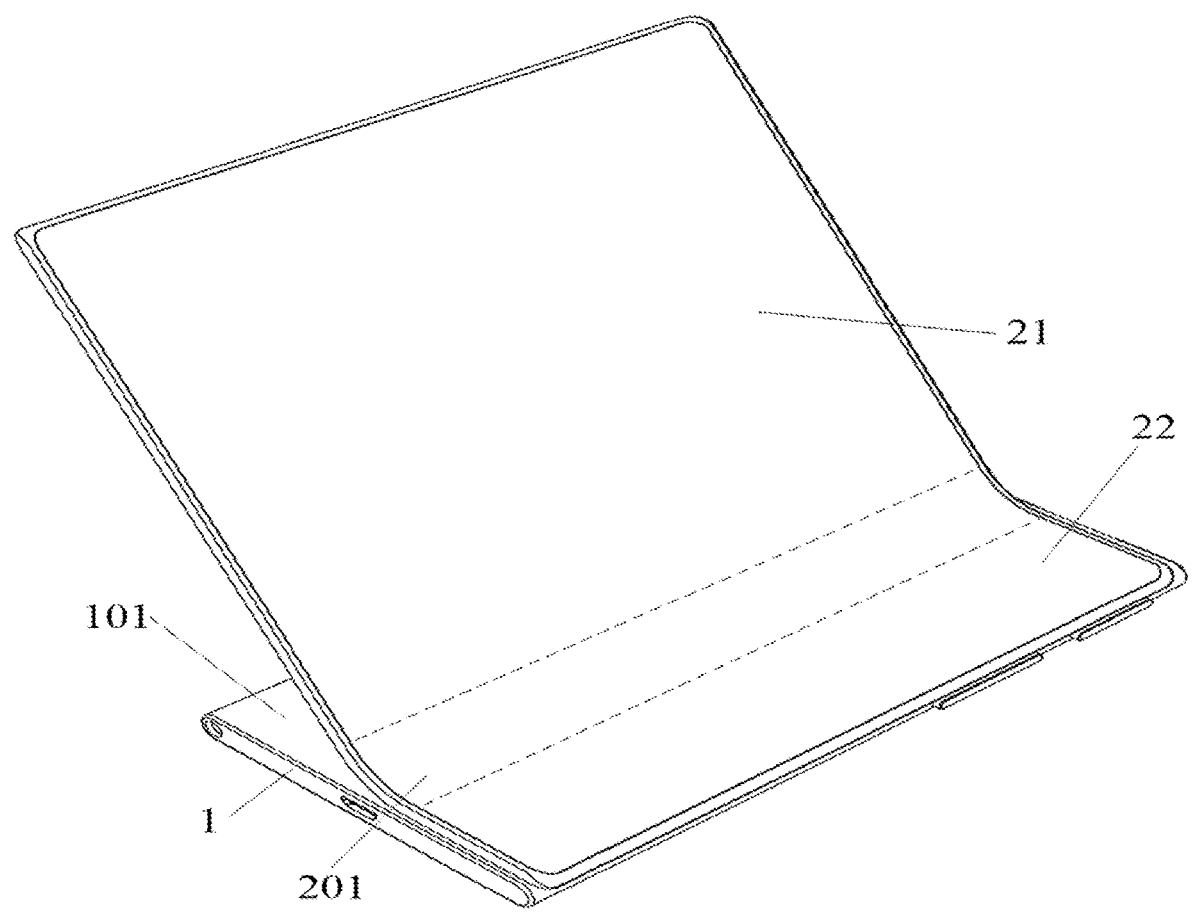
FIG. 1 is a schematic structural diagram of an electronic device according to one embodiment of the present disclosure.

Some embodiments of the present disclosure describe an electronic device. In the illustrated embodiment of FIG. 1, the electronic device includes: a body 1 that, in the illustrated embodiment, includes at least a first surface 101; a display screen 2 which includes a first portion 21 and a second portion 22. In some embodiments, the second portion 22 is secured to the first surface 101. In some embodiments, there exists a first bending portion 201 between the first portion 21 and the second portion 22. In some embodiments, when the first portion 21 rotates with respect to the second portion 22, the first portion 21 causes the first bending portion 201 to deform, the first bending portion 201 is positioned in the first surface 101.

In some embodiments, the above-described electronic device can be a smart device provided with a display screen. Examples may include a smartphone, a tablet computer, a laptop computer, a smart watch, and the like. In the following description, a plurality of example is illustrated in detail by taking the smartphone as an example of the electronic device.

Figure 2:
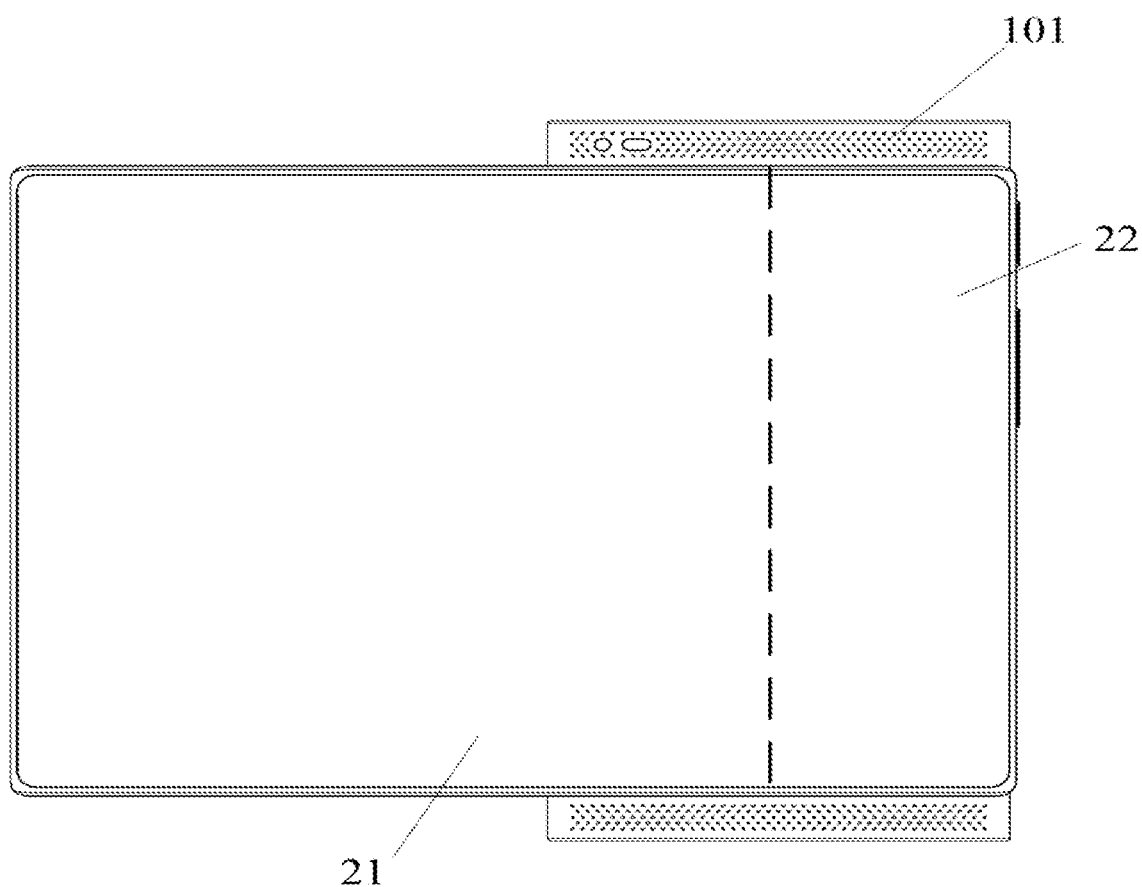
FIG. 2 is a schematic structural diagram of a smartphone according to one embodiment of the present disclosure.

In some embodiments, as illustrated in FIG. 2, the smartphone includes a smartphone body and a display screen. In the illustrated embodiment, the display screen includes a first portion 21 and a second portion 22 connected to the first portion 21. In some embodiments, the second portion 22 in the display screen is connected to the smartphone body so as to enable the signal to be transmitted between the smartphone body and the display screen of the smartphone and so as to enable the connection between the display screen and the smartphone body. In some embodiments, the second portion 22 of the display screen can be completely connected to the smartphone body. For example, the back face of the second portion 22 may be completely secured tightly to the first surface 101 of the smartphone body. In another example, only some structures of the second portion 22 may be connected to the smartphone body. In a further example, the end of the second portion 22 that is opposite to the connection end with the first portion 21 may be fixedly connected to the first surface 101 of the smartphone body. In another example, the central area of the back face in the second portion is tightly connected to the first surface 101 of the smartphone body, and so on. In the illustrated embodiment, the back face of the second portion 22 is completely connected to the first surface 101 of the smartphone body.

In other embodiments, the display screen can be a complete display screen, as illustrated in FIG. 2, and can display the contents as a complete display screen. In some embodiments, if the connection end between the first portion 21 and the second portion 22 lies in the first surface, the proportions of the first portion 21 and the second portion 22 in the display screen can be selectively set based on actual needs. For example, the size of the first portion 21 in the display screen can be set to occupy 70% of the display screen, or the size of the second portion 22 in the display screen can be selected as 30% of the display screen, and the like. The present disclosure places no specific restriction thereon.

Figure 3A:
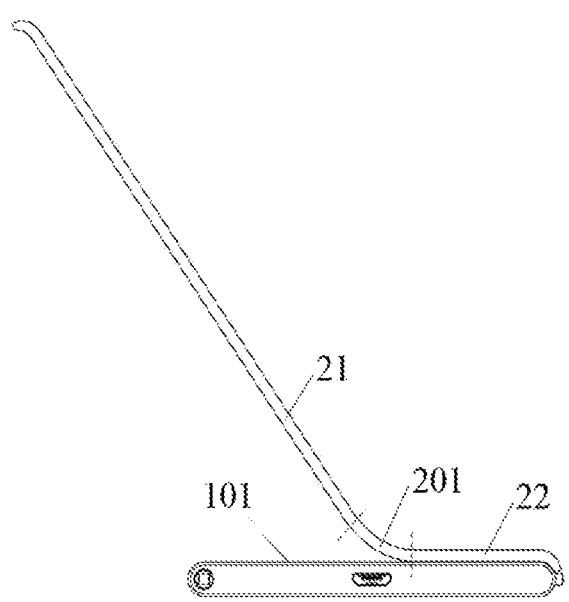
FIG. 3A is a schematic state diagram of an electronic device in a first arrangement according to one embodiment of the present disclosure.

Further, in the illustrated embodiment shown in FIG. 3A, there exists a first bending portion 201 between the first portion 21 and the second portion 22. In some embodiments, the first bending portion 201 corresponds to the connection end between the first portion 21 and the second portion 22, and lies in the first surface 101. In some embodiments, when the first portion 21 rotates, with respect to the second portion, 22 under an external force, the first portion 21 causes the first bending portion 201 to deform, then the first bending portion 201 bends, accordingly the connection end between the first portion 21 and the second portion 22 presents a cambered structure. In further embodiments, when the first portion 21 rotates, with respect to the second portion 22, to the position as illustrated in FIG. 3A, the electronic device is in a first state.

Figure 3B:
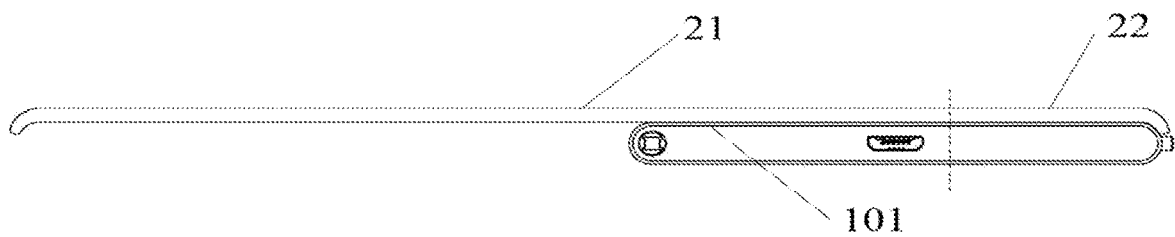
FIG. 3B is a schematic state diagram of an electronic device in a second arrangement according to one embodiment of the present disclosure.

In other embodiments, when the first portion 21 rotates, with respect to the second portion 22, to the position as illustrated in FIG. 3B, the first portion 21 and the second portion 22 are in a same plane that is planar parallel with the first surface 101, then the electronic device is in a second state.

In one embodiment, in order to maintain the deformation of the first bending portion, the first bending portion is provided with a flexible support apparatus, and when the first portion rotates with respect to the second portion, under an external force, the flexible support apparatus causes the first bending portion to deform, and can maintain the deformation of the first bending portion after the external force is withdrawn.

It should be noted that, in some embodiments, the entire above-described display screen can be a flexible display screen, or the above-described display screen can be a display screen that is flexible in at least the first bending portion and is rigid in the other portions. The present disclosure places no specific restriction thereon.

In some embodiments, other than being disposed at the first bending portion, the flexible support apparatus can be disposed under the entire display screen or a flexible support apparatus is disposed at the periphery of the display screen. The present disclosure places no specific restriction thereon.

Herein, the specific structure of the flexible support apparatus, in some embodiments, the flexible support apparatus is disposed at the first bending portion.

Figure 4A:
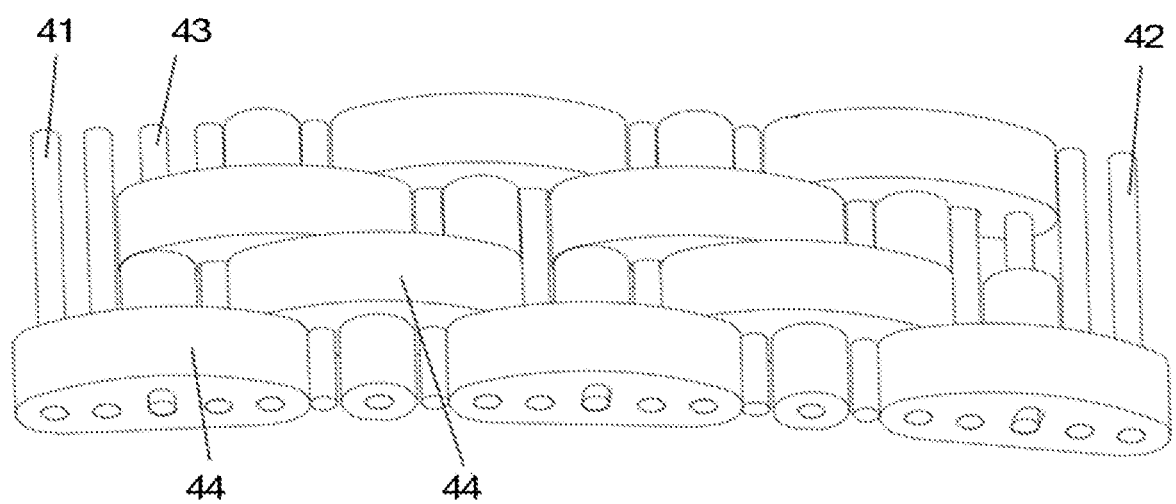
FIG. 4A is a schematic structural diagram of a flexible support apparatus according to one embodiment of the present disclosure.

As illustrated in FIG. 4A, some embodiments of the flexible support apparatus include a first sliding shaft 41, a second sliding shaft 42, an intermediate sliding shaft set 43, and a connecting member set 44. In some embodiments, the axes of the first sliding shaft 41, the second sliding shaft 42, and the intermediate sliding shaft set 43 are parallel with each other. In some embodiments, the first sliding shaft 41 and the second sliding shaft 42 are located on each side of the intermediate sliding shaft set 43. In some embodiments, the connecting member set 44 movably connects the intermediate sliding shaft set to the first sliding shaft 41 and the second sliding shaft 42. In some embodiments, the flexible apparatus is bendable along the extension direction of the intermediate sliding shaft set and the bending region of the flexible apparatus always maintains a cambered structure. In some embodiments, the flexible support apparatus maintains a cambered structure at the bending region, after deformation, to support and protect the flexible deformation of the first bending portion in the display screen.

In some embodiments, the two ends of the connecting member set 44 are muff-coupled with the first sliding shaft 41 and the second sliding shaft 42 respectively, and the central portion of the connecting member set 44 is muff-coupled with the intermediate sliding shaft set 43.

In some embodiments, the connecting member set is configured to comprise double axle gears that are muff-coupled with the sliding shaft set. The double axle gears may connect the sliding shafts together and the adjacent double axle gears may be engaged to form an interference connection, so as to enable the intermediate sliding shaft arranged in a row in the flexible support apparatus to form a cambered structure. In some embodiments, the bending region of the flexible support apparatus, after deformation, maintains a cambered structure to support and protect the flexible deformation of the first bending portion in the display screen.

In some embodiments, the bending region of the flexible support apparatus includes M sliding shafts, and the cambered structure at the bending region means that the external tangent surface of these M sliding shafts presents a cambered surface. In some embodiments, M is an integer greater than or equal to 2.

In some embodiments, when the M sliding shafts forms a cambered structure, the sliding shafts on a first side of the M sliding shafts are stationary with respect to each other and the sliding shafts on a second side of the M sliding shafts are stationary with respect to each other.

In other embodiments, the cambered structure at the bending region refers to the cambered surface formed by the external tangent surface of the M sliding shafts at the bending region. In some embodiments, when a cambered structure is formed at the bending region of the flexible support apparatus, the sectional plane of the cambered structure at the bending region is a cambered surface.

In some embodiments, while the M sliding shafts are forming a cambered structure, the sliding shafts on either side of the M sliding shafts are stationary with respect to each other. In other words, while the M sliding shafts are forming a cambered structure, both sides of the bending region on the flexible support apparatus do not deform to facilitate the bending of the flexible support apparatus by the user as desired. In some embodiments, the above-described M sliding shafts include the first sliding shaft 41 and part of the intermediate sliding shaft set 43. In other embodiments, the M sliding shafts include the second sliding shaft 42 and part of the intermediate sliding shaft set 43. In some embodiments, the M sliding shafts include the first sliding shaft 41, the second sliding shaft 42, and the sliding shaft set 43.

Accordingly, the flexible support apparatus can form a C-shaped cambered structure, or a curl or reel shape, to facilitate its storage by the user.

Figure 4B:
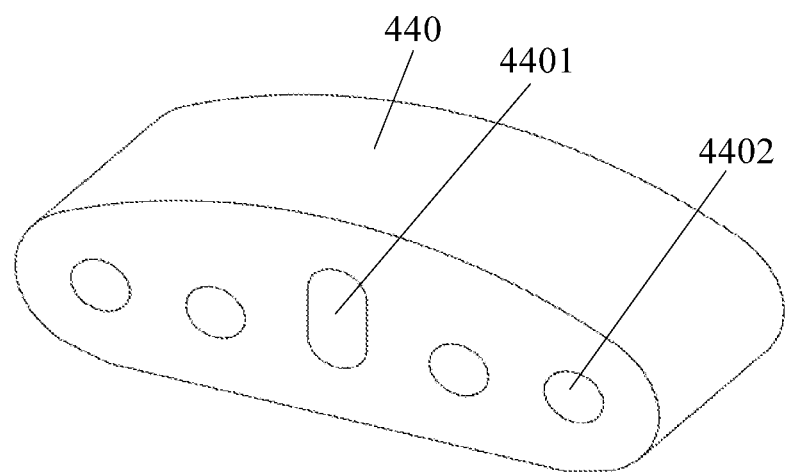
FIG. 4B is a schematic structural diagram of a component of a flexible support apparatus according to one embodiment of the present disclosure.

In some embodiments, in order to simplify the structure and facilitate assembly, as illustrated in FIG. 4B, the above-described connecting member set may include a first connecting member 440. In some embodiments, the first connecting member 440 includes five muff-coupling holes arranged along a first linear direction. In some embodiments, the central muff-coupling hole is a first muff-coupling hole 4401 while the muff-coupling holes on both sides are second muff-coupling holes respectively. In some embodiments, the first muff-coupling hole 4401 enables the sliding shaft cooperating with the first muff-coupling hole 4401 to rotate around its axis and enables the sliding shaft to slide along the direction perpendicular to the first linear direction. In some embodiments, the second muff-coupling hole 4402 enables the sliding shaft cooperating with the second muff-coupling hole 4402 to rotate around its axis.

Figure 4C:
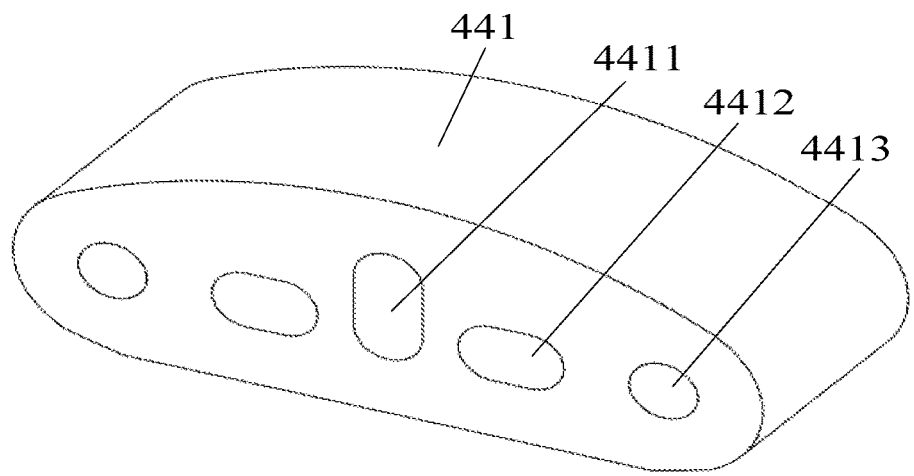
FIG. 4C is a schematic structural diagram of a component of a flexible support apparatus according to one embodiment of the present disclosure.

As illustrated in FIG. 4C, the above-described connecting member set can be a second connecting member 441. In some embodiments, the second connecting member 441 includes five muff-coupling holes arranged along a second linear direction. In some embodiments, the central muff-coupling hole is a third muff-coupling hole 4411, the two muff-coupling holes immediately adjacent to the third muff-coupling hole 4411 are fourth muff-coupling holes 4412 respectively, while the two muff-coupling holes on both ends are fifth muff-coupling holes 4413 respectively. In some embodiments, the third muff-coupling hole 4411 enables the sliding shaft cooperating with the third muff-coupling hole 4411 to rotate around its axis and enables the sliding shaft to slide along the direction perpendicular to the second linear direction. In some embodiments, the fourth muff-coupling hole 4412 enables the sliding shaft cooperating with the fourth muff-coupling hole to rotate around its axis and enables the sliding shaft to slide along the direction perpendicular to the second linear direction. In some embodiments, the fifth muff-coupling hole 4413 enables the sliding shaft cooperating with the fifth muff-coupling hole 4413 to rotate around its axis.

In some embodiments, the first connecting members 441 connect, end to end, to each other along the arrangement direction of the intermediate sliding shaft set to form the first connecting member set. In some embodiments, the second connecting members 441 connect, end to end, to each other along the arrangement direction of the intermediate sliding shaft set to form the second connecting member set. In some embodiments, the first muff-coupling hole 4411 and the fifth muff-coupling hole 4414 are muff-coupled with a same sliding shaft. The term "connect, end to end" as described above means that the muff-coupling holes at respective ends of two adjacent connecting members are muff-coupled with a same sliding shaft so as to form the first connecting member set and the second connecting member set in which the connecting members are arranged in a staggered manner. In some embodiments, in order to facilitate the manufacture, the third muff-coupling hole 4411 and both of the fourth muff-coupling holes 4412 as described above can be configured to be in communication with each other.

In the flexible support apparatus as provided in the present embodiment, two types of connecting members are muff-coupled with sliding shafts respectively. In some embodiments, during use, the M sliding shafts can form a cambered structure by means of the movement of the sliding shafts in the muff-coupling holes and the slight deformation of the sliding shafts, which is simple in structure and easy to assemble. In some embodiments, by adjusting the sizes of the muff-coupling holes, the external tangent surface of the above-described M sliding shafts can be deformed to an arcuate surface, which on one hand can meet the usage requirement of the user, and on the other hand facilitates storage by the user by decreasing the volume of the flexible support apparatus when folded into a U-shaped or serpentine structure.

In the flexible support apparatus as provided in the above embodiment, in the first connecting member set the number of the first connecting members 440 is at least 5, while in the second connecting member set the number of the second connecting member 441 is at least 4, so as to ensure that the flexible support apparatus is bendable and the bending region is always cambered during bending.

In some embodiments, where the flexible support apparatus is provided in the first bending portion of the display screen, in the flexible support apparatus the number of the first connecting members 440 in the first connecting member set can be five while the number of the second connecting members 441 in the second connecting member set can be four.

In some embodiments, where the flexible support apparatus is provided under the whole display screen, or is provided under the first portion of the display screen, or is provided at the periphery of the display screen, those skilled in the art can appropriately select the number of the first connecting members 440 in the first connecting member set and the number of the second members in the second connecting member set based on the size of the area in which the flexible support apparatus needs to be provided, for example, where the flexible support apparatus is only provided under the first portion of the display screen, the number of the first connecting members 440 in the first connecting member set can be selected to be ten, the number of the second connecting members in the second connecting member set can be selected to be eight, and the like.

The flexible support apparatus as described above can be configured to be bendable along one side. In some embodiments, one end of the first muff-coupling hole 4401 protrudes from one side of a first straight line, the other end of the first muff-coupling hole 4401 is flush with an end of the second muff-coupling hole 4402. In some embodiments, one end of the third muff-coupling hole 4411, as described above, protrudes from one side of a second straight line, the other end of the third muff-coupling hole 4411 is flush with the ends of the fourth muff-coupling hole 4412, and the fifth muff-coupling hole 4413. In some embodiments, the protruding directions of the first muff-coupling hole 4401 and the third muff-coupling hole 4411 are towards the same side of the flexible support apparatus. The flexible support apparatus, as provided in the illustrated embodiment, is bendable from its flat state towards one side of the flexible support apparatus. In some embodiments, this arrangement can prevent the device, such as a flexible screen, that is supported by the flexible support apparatus from bending towards the opposite direction and can prevent the device, such as the flexible screen as described above, from being damaged.

In some embodiments, depending on actual needs, the flexible support apparatus can also be configured to be bendable towards both sides. In some embodiments, both ends of the first muff-coupling hole 4401 protrude from the respective sides of the first straight line respectively and both ends of the third muff-coupling hole 4411 protrude from the respective sides of the second straight line respectively. The embodiments described above place no restriction on the bending direction of the flexible support apparatus. In some embodiments, only the protruding directions of the first muff-coupling hole 4401 and the third muff-coupling hole 4411 need to be adjusted according to actual needs. In some embodiments, the bending degree of the flexible support apparatus can be adjusted according to actual needs by adjusting the length of the first muff-coupling hole 4401 and the third muff-coupling hole 4411.

In some embodiments, the display screen, as supported by the flexible support apparatus, may be kept in a stationary state. In some embodiments, the flexible support apparatus, as provided in the embodiments described above, is able to maintain any bend state.

Figure 4D:
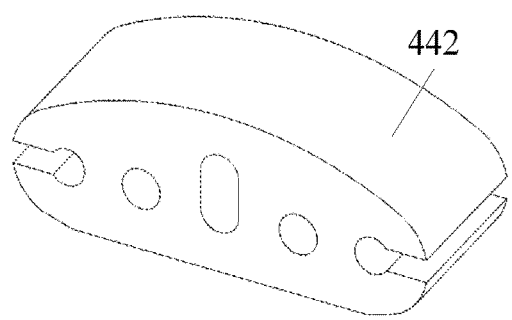
FIG. 4D is a schematic structural diagram of a component of a flexible support apparatus according to one embodiment of the present disclosure.
Figure 4E:
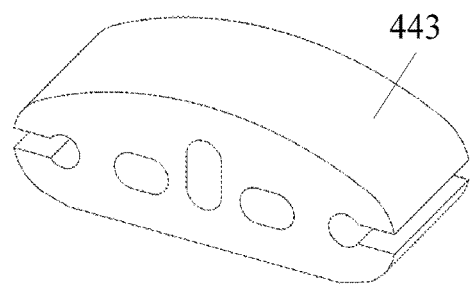
FIG. 4E is a schematic structural diagram of a component of a flexible support apparatus according to one embodiment of the present disclosure.
Figure 4F:
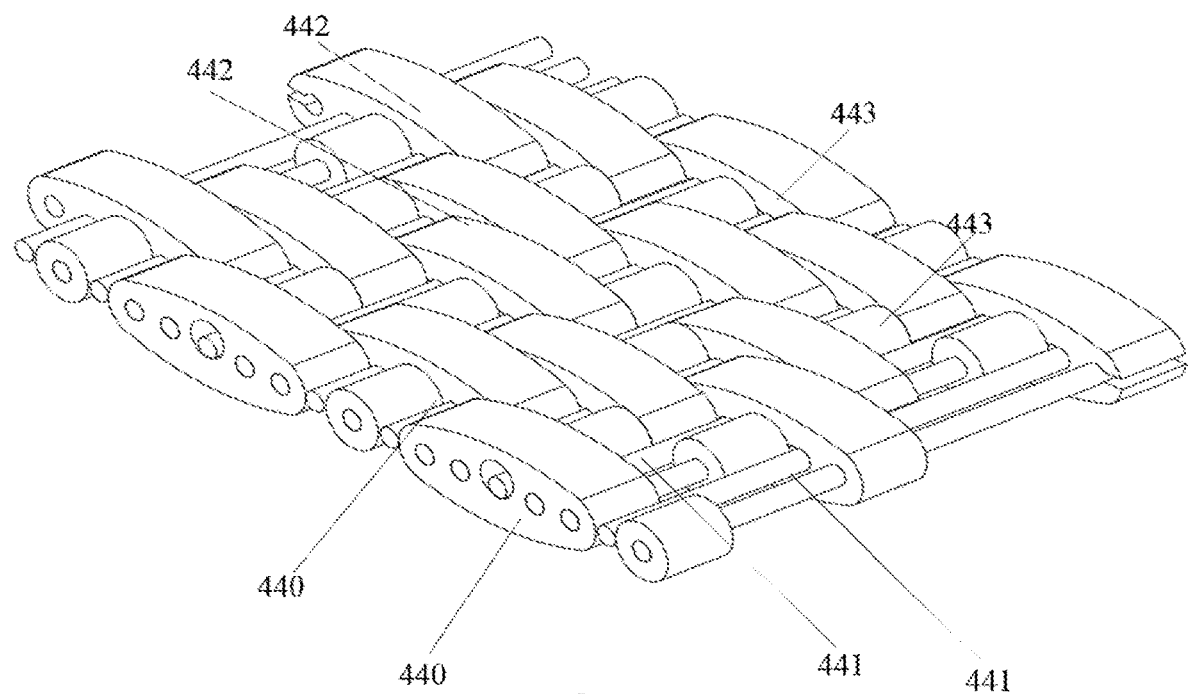
FIG. 4F is a schematic structural diagram of a flexible support apparatus according to one embodiment of the present disclosure.

In some embodiments, the flexible support apparatus, as described above, can be maintained at any bend state by means of additional member. In the illustrated of FIGS. 4D and 4E, the connecting member set includes a third connecting member 442 and a fourth connecting member 443. As illustrated in FIG. 4F, in one embodiment, the third connecting member 442 has the same structure and arrangement as the first connecting member 440 and is muff-coupled with a same sliding shaft as the first connecting member 440. In some embodiments, the fourth connecting member 443 has the same structure and arrangement as the second connecting member 441 and is muff-coupled with a same sliding shaft as the second connecting member 441. In some embodiments, in the third connecting member 442, one or both of the second muff-coupling holes 4402 on both ends can provide rotation damping to the corresponding sliding shaft. In some embodiments, the fifth muff-coupling hole 4413 in the fourth connecting member 443 can provide rotation damping to the sliding shaft corresponding to the fifth muff-coupling hole 4413. In some embodiments, both of the second muff-coupling holes 4402 at both ends of the third connecting member 442, as described above, as well as the fifth muff-coupling hole 4413 of the fourth connecting member 443, can be configured as opening hole respectively, which facilitates their assembly with muff-coupling hole and enables these two types of muff-coupling holes to provide rotation damping to the corresponding sliding shaft with interference fit.

In some embodiments, in order to reduce the number of the connecting member and simplify the assembly, the flexible support apparatus, as provided in the above embodiment, configures the second muff-coupling holes 4402 on both ends of the first connecting member and the fifth muff-coupling hole 4413 of the second connecting member as the muff-coupling holes that can provide rotation damping to the corresponding sliding shaft to enable the flexible support apparatus to be maintained at any bend state. In some embodiments, a friction pad such as a rubber pad and the like can be fixed in the muff-coupling hole as described above, for tightly fitting the sliding shaft.

Figure 4G:
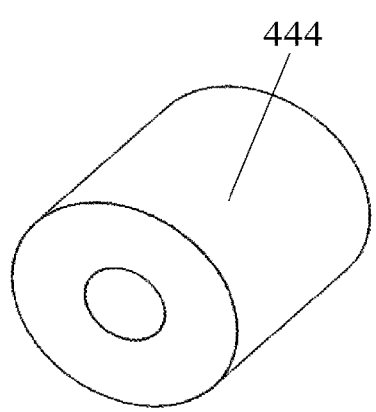
FIG. 4G is a schematic structural diagram of a component of a flexible support apparatus according to one embodiment of the present disclosure.

In some embodiments of the flexible support apparatus, as described above, the connecting members in a connecting member set are arranged in a staggered manner. In some embodiments, there exists many voids between the connecting members which makes the device supported by the flexible support apparatus susceptible to damage under external force. Therefore, in some embodiments, the flexible support apparatus further includes a filler block 444, as illustrated in FIG. 4G, which is sleeved on the sliding shaft and is positioned between two connecting members, in the connecting member set, that are spaced apart. In the connecting member set as described above, there are three sliding shafts between two connecting members that are spaced apart. In some embodiments, in order to avoid affecting the relative movement among these sliding shafts, the filler block 444 is sleeved on at least one of these three sliding shafts. In some embodiments, it is possible to sleeve the filler block 444 on any two or even all three of these three illustrated sliding shafts.

In some embodiments, the first connecting member and the second connecting member can be block structures respectively. In other embodiments, the third connecting member, the fourth connecting member, and the filler block can also be block structures. In other embodiments, the first connecting member and the second connecting member can be sheet structures. In some embodiments, the sheet structures may be easily manufactured with punching. In some embodiments, the third connecting member, the fourth connecting member, and the filler block can be easily manufactured with punching.

In another embodiment, in order to enhance the intelligence of the electronic device, to facilitate the user operation, and to provide good user experience, the electronic device can further include a second controller built in the body. In some embodiments, upon detecting the deformation of the first bending portion, the second controller controls the first portion to display a second display content and controls the second portion to display a third display content that is different from the second display content.

In some embodiments, upon detecting the deformation of the first bending portion to some extent, the second controller controls the first portion to display a second display content and controls the second portion to display a third display content. For example, when the first portion is positioned within 90° to 120° with respect to the second portion, the second controller can control the first portion to display a display interface and control the second portion to display a virtual input interface. In some embodiments, the second portion includes an input unit, such as a touch screen, such that the user can perform input operation on the second portion.

In some embodiments, the electronic device further includes a first controller. In some embodiments, when the first portion rotates, with respect to the second portion, to the second position, (i.e. when the electronic device is in a second state,) the first controller can control the first portion and the second portion to cooperate to display a first display content, that is, the display screen displays a complete display content.

In some embodiments, the first controller and the second controller can be a single physical entity, or can be different physical entities, for which the present invention places no restriction.

In some embodiments, the display screen is divided into a first portion that is independent from the body and a second portion secured to the body. In some embodiments, the first portion is rotatable with respect to the second portion. In some embodiments, when using the electronic device, the user can obtain a better angle of view by simply changing the relative position between the first portion and the body, thereby facilitating the user's operation and providing a good user experience. In some embodiments, the first bending portion is provided with a flexible support apparatus that is not only able to cause the first bending portion to deform, but can also stably support and maintain the posture of the display screen after deformation, thereby enabling the user to better operate the electronic device and improve the user experience.

Figure 5:
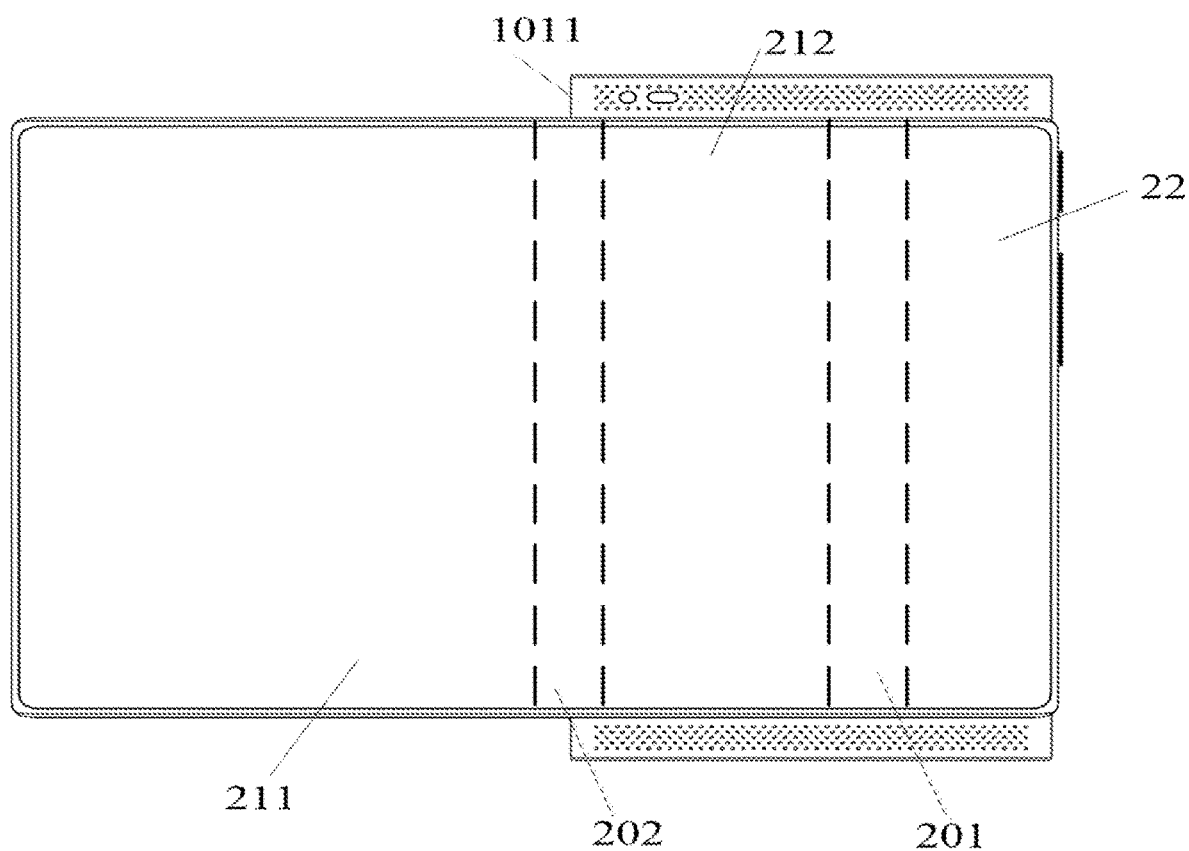
FIG. 5 is a schematic structural diagram of an electronic device according to one embodiment of the present disclosure.

In some embodiments, the electronic device has a second posture, as illustrated in FIG. 5. In the illustrated embodiment, the first portion includes a first sub-portion 211 and a second sub-portion 212. In some embodiments, there exists a second bending portion 202 between the first sub-portion 211 and the second sub-portion 212 with the second bending portion 202 positioned on the first side 1011 of the first surface 101.

In some embodiments, in addition to being bendable at the first bending portion, the display screen is also bendable at the second bending portion. In some embodiments, the first portion is divided into two parts (i.e. the first sub-portion and the second sub-portion,) and the second bending portion is positioned between these two sub-portions.

Figure 3C:
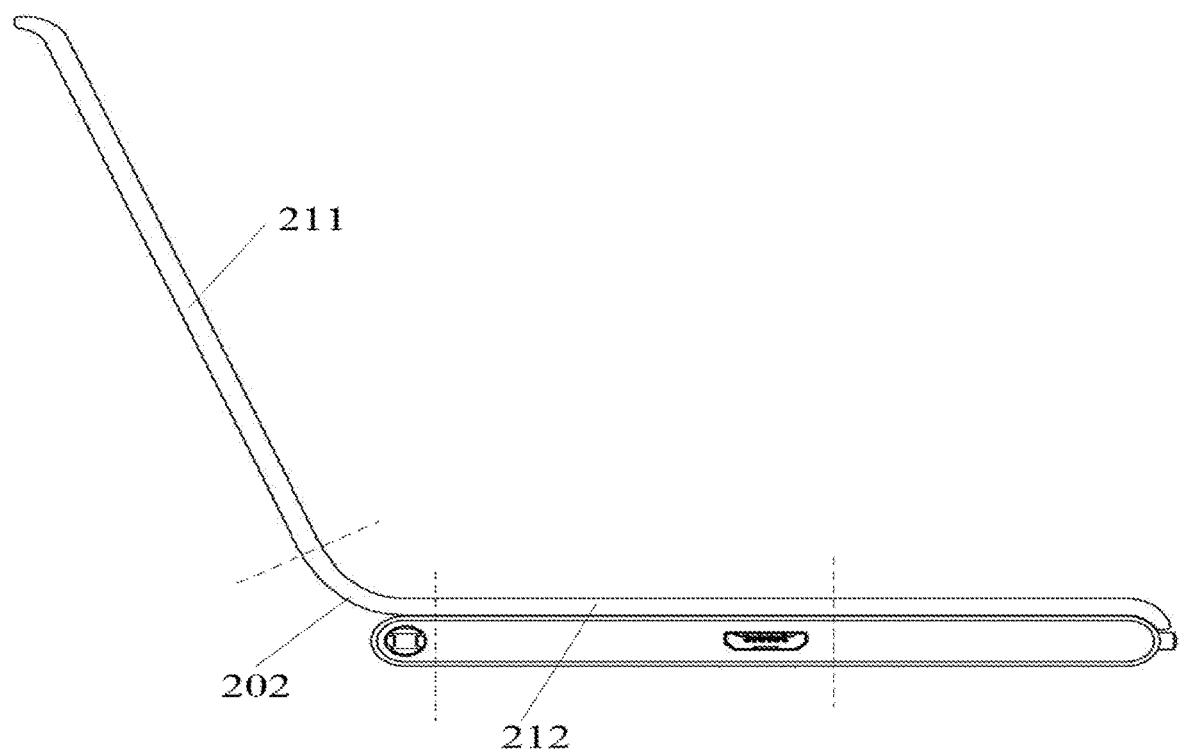
FIG. 3C is a schematic state diagram of an electronic device in a third arrangement according to one embodiment of the present disclosure.

In the illustrated of FIG. 3C, when the first sub-portion 211 rotates with respect to the second sub-portion 212, the second sub-portion 212 is maintained in the same plane as the second portion 22, (i.e. conforming to the first surface 101,) while the first sub-portion 211 makes the second bending portion 202 deform. In some embodiments, this arrangement corresponds to the electronic device as being in a third state.

In some embodiments, like the first bending portion, the second bending portion can be provided with a flexible support apparatus as described above, to maintain the deformation of the second bending portion. In some embodiments, when the first sub-portion rotates with respect to the second sub-portion towards a first direction, the first bending portion is in a flat state while the second bending portion is in a bending state.

Figure 3D:
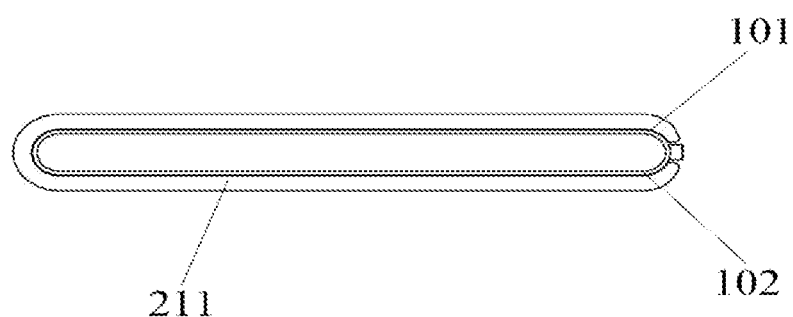
FIG. 3D is a schematic state diagram of an electronic device in a fourth arrangement according to one embodiment of the present disclosure.

In some embodiments, in addition to bending towards one side, the second bending portion can also bend towards the other side. In some embodiments, when the first sub-portion rotates with respect to the second sub-portion towards a second direction, the second sub-portion is maintained in the same plane as the second portion. In some embodiments, the first sub-portion causes the second bending portion to deform towards the other side and the first sub-portion deforms around the body. In some embodiments, when the first sub-portion rotates with respect to the second sub-portion towards the second portion to a first position, as illustrated in FIG. 3D, the first sub-portion 211 conforms to a second surface 102 of the body, (i.e. the surface opposite to the first surface 101,) then, if the length of the first portion 21 is equal to the sum of the lengths of both the first surface 101 and the second surface 102 of the body, the first portion 21 can cover the second surface 102 of the body opposite the first surface 101, so the electronic device is in a fourth state.

In some embodiments, when the electronic device is in the third state, the second controller in the electronic device can control the first sub-portion to display a second display content and control the second sub-portion and the second portion to cooperate to display a third portion. In some embodiments, when the electronic device is in the fourth state, the first controller in the electronic device can control the display screen to display a complete display interface. In other embodiments, the second controller can control the first sub-portion to display the second display content and control the second sub-portion and the second portion to cooperate to display the third portion.

In some embodiments, the display screen in the electronic device is not only able to stably maintain the state after flexible deformation around the device body. In some embodiments, the display screen can also stably maintain the state after the flexible deformation other than that around the device body. In some embodiments, this stable positioning facilitates multiple postures of the display screen of the electronic device. In some embodiments, the second bending portion is provided with a flexible support apparatus that is able to make the second bending portion deform, but can also stably support and maintain the posture of the display screen after deformation. In some embodiments, this enables the user to better operate the electronic device and thus to achieve the technical effect of improving user experience.

In some embodiments, based on the current state of the display screen, the first controller and the second controller determine the specific display area of the display screen for the current displayed content, so as to make the display of the displayed content meet the user's needs better.

A person skilled in the art should understand that the phrases "one embodiment" or "an embodiment" referenced in this specification indicate that particular characteristics, structures, or features associated with that embodiment may be incorporated into at least one embodiment consistent with this disclosure. Therefore, the phrases "in one embodiment" or "in an embodiment" in this specification do not necessarily refer to the same embodiment. In addition, the described characteristics, structures, or features may be incorporated in one or more embodiments in any suitable manner. It should be understood that in various embodiments of the present invention, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present invention. The sequential numbers of the embodiments of the present invention are for description purpose only, and they do not denote preference of the embodiments.

It should be noted that, in this specification, terms such as "comprises", "comprising", "includes", "including", "contains", "containing" or any other variation thereof, are intended to cover a non-exclusive inclusion, such that a process, method, article, or apparatus, that comprises, has, includes, contains a list of elements include not only those elements but may include other elements not expressly listed or inherent to such process, method, article, or apparatus. An element proceeded by "comprises a . . . ", "has a . . . ", "includes a . . . ", "contains a . . . " does not, without more constraints, preclude the existence of additional identical elements in the process, method, article, or apparatus.

It shall be understood that the devices and methods disclosed in the embodiments provided in the application may be implemented in other ways. The device embodiments described above are merely illustrative. For example, the division of units is merely a division based on logical functions and there may be other ways of division in real practice. For example, multiple units or components may be combined, or may be integrated into another system, or some features may be omitted or not performed. Additionally, coupling, direct coupling, or communication connections among the component parts as shown or discussed may be implemented through some interface(s), and indirect coupling or communication connections of devices or units may be in an electrical, mechanical, or other form.

The units described as separate components may or may not be physically independent of each other. The element illustrated as a unit may or may not be a physical unit, and it can be located at one place or deployed on a plurality of network units. A part or all of the units may be selected according to actual needs to achieve the objectives of the solutions of the embodiments.

In addition, the functional units in the various embodiments of the present invention may be integrated in one processing unit, or may exist as separate units respectively, or two or more units as described above may be integrated into one unit. The integrated unit may be practiced by means of a hardware, or may also be practiced in a form of a hardware and a software functional unit.

The above are only some specific embodiments of the present invention, and the protection scope of the present disclosure is not limited thereto. Variations or alterations that are within the technical scope as disclosed in the present invention and may be readily conceived by those skilled in the art shall fall within the protection scope of the present invention. Accordingly, the protection scope of the present invention is defined by the claims.

What is claimed is:

1. An electronic device, comprising:
   a body comprising at least a first surface having a first edge and a second surface opposite the first surface and the second surface having a second edge, wherein the first edge and the second edge are mutually opposed to each other;
   a controller built into the body; and
   a single unified display screen configured to continuously wrap around the body from the first edge of the first surface to the second edge of the second surface in a wrapped stated to provide a viewable display, wherein the display screen comprises a first portion and a second portion separated from the first portion by a first bending portion, the second portion being secured to the first surface of the body;
   wherein, the first bending portion of the display screen is deformable to rotate the first portion with respect to the second portion, and to support the first portion of the display screen away from the second surface and the first surface of the body in an expanded state; and
   wherein, in response to detection of the display screen as being in the expanded state, the controller is configured to display a first display content via the first portion of the display screen and to display a second display content via the second portion of the display screen, the second display content being different from the first display content and, in response to detection of the display screen as being in the wrapped state, the controller is configured to display a third display content via the first portion or the second portion of the display screen.

2. The electronic device according to claim 1, wherein the first bending portion comprises a flexible support apparatus to deform the first bending portion in response to an external force and maintain the deformation of the first bending portion in response to a withdrawal of the external force.

3. The electronic device according to claim 2, wherein the flexible support apparatus comprises:
   a first sliding shaft;
   a second sliding shaft;
   an intermediate sliding shaft set comprising a plurality of intermediate sliding shafts arranged in parallel; and
   a connecting member set movably connecting the intermediate sliding shaft set to the first sliding shaft and to the second sliding shaft;
   wherein, the first bending portion is deformable along a length of the intermediate sliding shaft set.

4. The electronic device according to claim 1, wherein the first portion comprises a first sub-portion and a second sub-portion separated from the first sub-portion by a second bending portion;
   wherein the second sub-portion remains in a plane with the second portion in response to the first bending portion remaining unbent and the first sub-portion rotating in a first direction with respect to the second sub-portion and wherein the rotation of the first sub-portion with respect to the second sub-portion causes the second bending portion to deform.

5. The electronic device according to claim 1, wherein the first portion comprises a first sub-portion and a second sub-portion separated from the first sub-portion by a second bending portion positioned on a first side of the first surface;
   wherein the second sub-portion remains in a plane with the second portion in response to the first bending portion remaining unbent and the first sub-portion rotating in a second direction with respect to the second sub-portion and wherein the rotation of the first sub-portion deforms the second bending portion around the body.

6. The electronic device according to claim 5, wherein the second bending portion deforms around the body to at least partially conform the first sub-portion to the second surface of the body, wherein the second surface is opposite to the first surface.

7. The electronic device according to claim 1, wherein, when the first portion rotates, with respect to the second portion, to the second position, the first portion and the second portion are oriented in a shared plane that is parallel with the first surface.

8. The electronic device according to claim 7, wherein, in response to rotation of the first portion, with respect to the second portion, to a second position, the controller controls the first portion and the second portion to cooperate to display a first display content.

9. The electronic device according to claim 1, further comprising an input unit disposed on the second portion to receive an input operation of the user.

* * * * *